United States Patent [19]

Ferrari et al.

[11] Patent Number: 5,295,939

[45] Date of Patent: Mar. 22, 1994

[54] MACHINE FOR FOLDING AND PERIPHERAL GLUEING OF THE EDGES OF SHEET MATERIAL AND THE LIKE

[75] Inventors: Roberto Ferrari; Mario Pagani, both of Vigevano, Italy

[73] Assignee: Sagitta Officina Meccanica S.P.A., Vigevano, Italy

[21] Appl. No.: 947,750

[22] Filed: Sep. 10, 1992

[30] Foreign Application Priority Data

Sep. 17, 1991 [IT] Italy .................. MI91A002453

[51] Int. Cl.⁵ .................. A43D 8/40; A43D 25/00
[52] U.S. Cl. .................. 493/1; 493/356; 493/938
[58] Field of Search .................. 493/1, 2, 3, 5, 7, 8, 493/13, 14, 17, 18, 22, 23, 29, 331, 356, 357, 405, 416, 438, 439, 457, 938

[56] References Cited

U.S. PATENT DOCUMENTS

| | | | |
|---|---|---|---|
| 3,059,856 | 10/1962 | Pagendarm | 493/331 |
| 3,654,842 | 4/1972 | Schwenk | 493/287 |
| 3,753,831 | 8/1973 | Copithorne | 156/479 |
| 4,066,008 | 1/1978 | Arvanigian | 493/10 |
| 4,340,212 | 7/1982 | Simson | 493/439 |
| 4,540,391 | 9/1985 | Fries | 493/356 |
| 4,692,133 | 9/1987 | Leeper | 493/128 |
| 4,994,008 | 2/1991 | Haake et al. | 493/2 |
| 5,104,365 | 4/1992 | Sone et al. | 493/1 |

FOREIGN PATENT DOCUMENTS

| | | | |
|---|---|---|---|
| 0133823 | 3/1985 | European Pat. Off. | 493/1 |
| 2060539 | 6/1972 | Fed. Rep. of Germany | 493/1 |
| 3-251445 | 11/1991 | Japan | 493/1 |

Primary Examiner—William E. Terrell
Attorney, Agent, or Firm—Bucknam and Archer

[57] ABSTRACT

A machine for folding and gluing peripherally the edges of a piece of work has a top on which the piece of work moves, a motor for transporting the moving piece of work, and a folding shoe which cooperates with a guide. A glue is fed. A plurality of actuators (A1-An) controls the various parts of the machine, and a control unit (UC) controls the machine operating parameters. The control (UC) has a programming device (PR) connected to the actuators (A1-An), a memory (M) accessible through the programming device (PR) and is designed to contain the parameters used in a more recent processing of the work executed manually by the operator. The operating parameters for processing a given piece of work are furnished to the machine through a learning phase controlled manually by the operator.

11 Claims, 4 Drawing Sheets

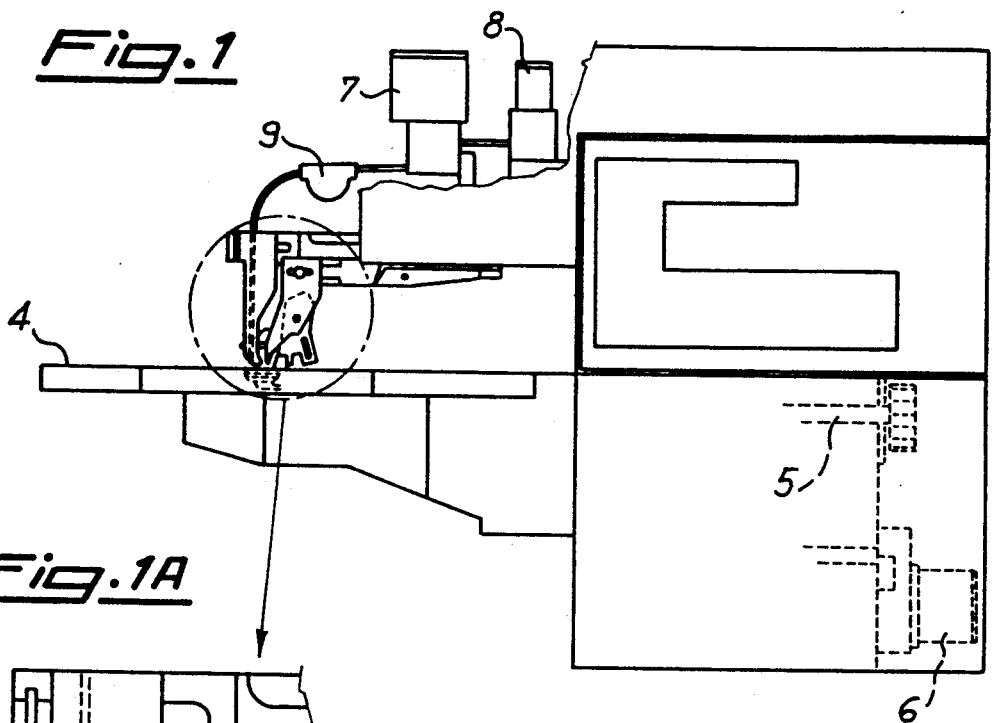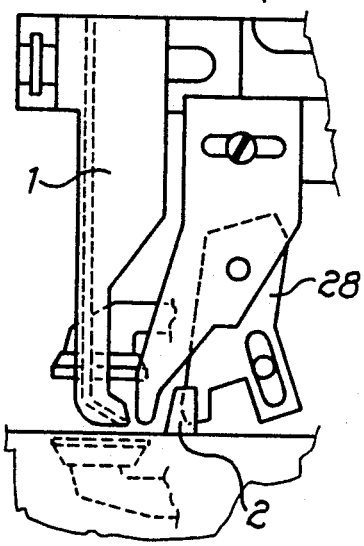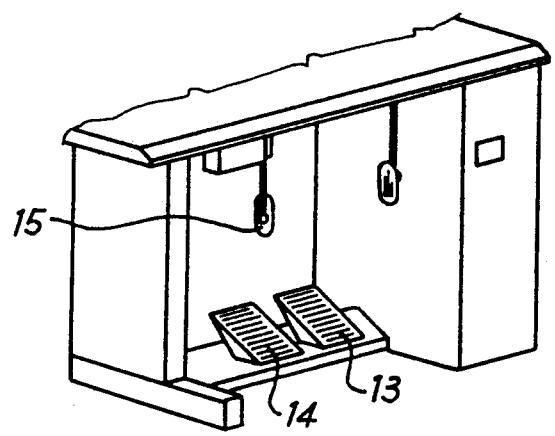

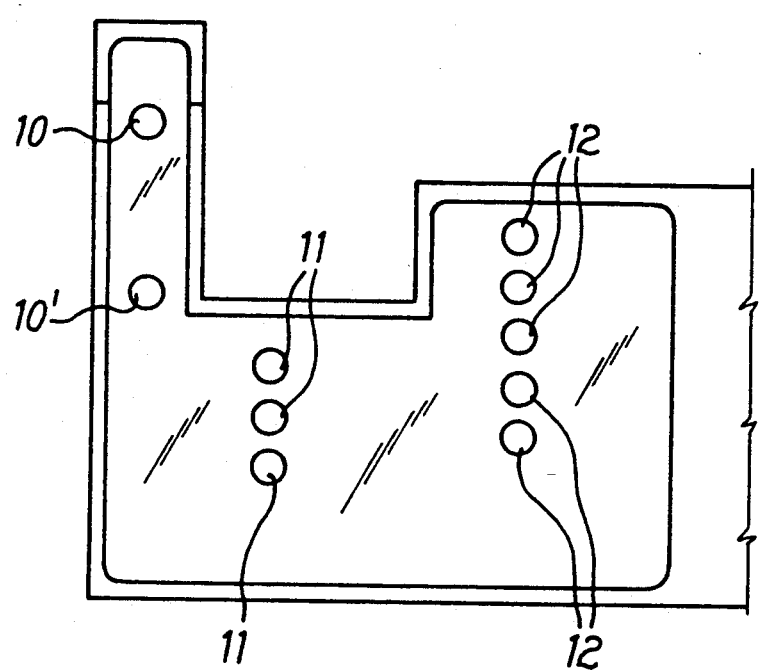

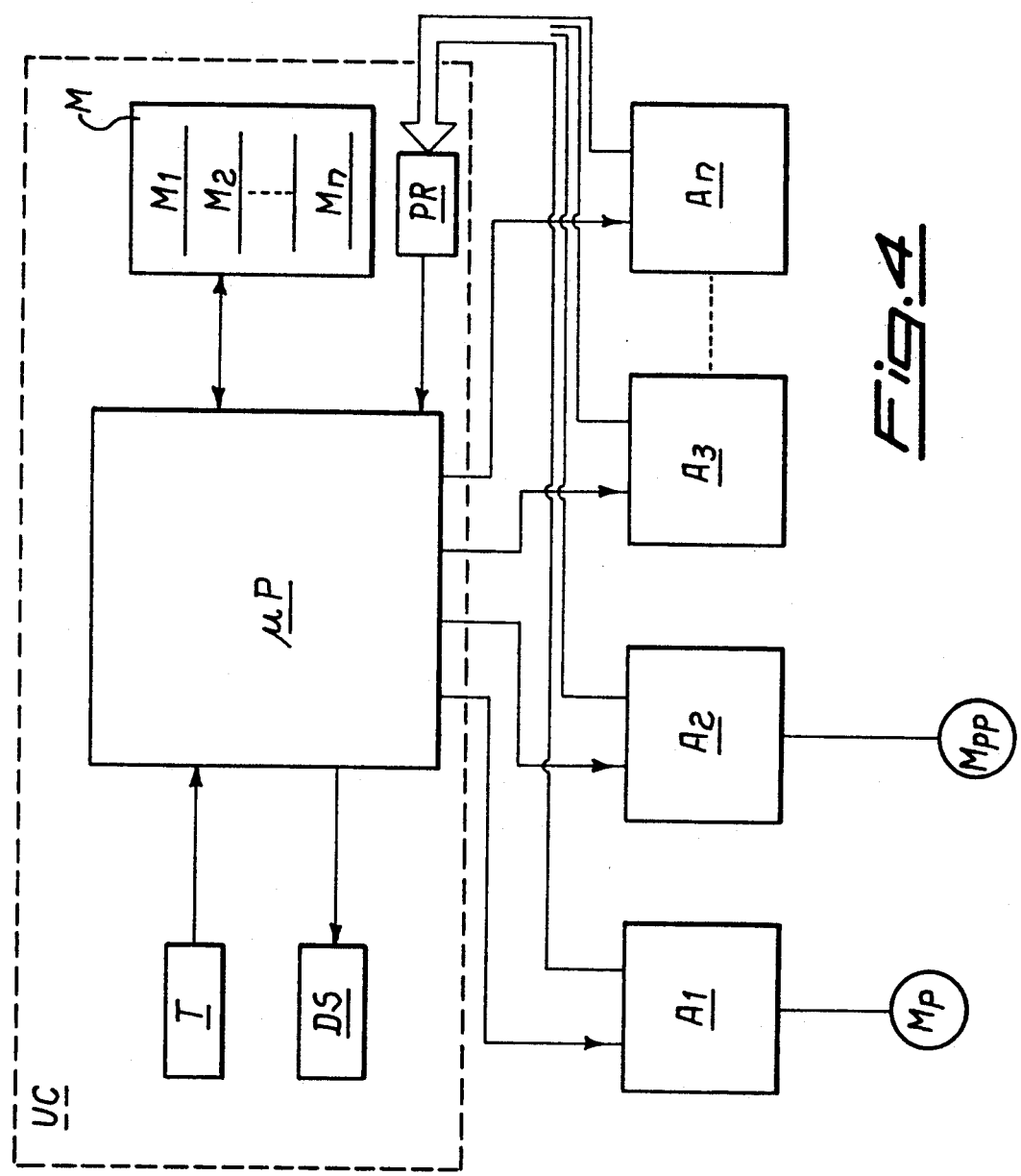

MACHINE FOR FOLDING AND PERIPHERAL GLUEING OF THE EDGES OF SHEET MATERIAL AND THE LIKE

BACKGROUND OF THE INVENTION

1. Field of the Invention

The present invention relates to a machine for folding and peripheral glueing of the edges of sheet material and the like.

In particular the present invention relates to a machine for folding and glueing of the upper in the manufacture of a shoe or leather products.

The invention also relates to a method for definition of the operating parameters in a machine for folding and peripheral glueing of the edges of sheet material and in particular for folding and glueing of the upper in the manufacture of a shoe or leather products.

For the sake of simplicity the present invention is described below in relation to the manufacture of shoes, however the invention finds application in the production of various types of products which require folding and glueing of sheet materials such as belts, wallets, purses and the like. The machine of the present invention can be used for these applications merely by replacing appropriate tools. The present description is therefore not intended to be limiting but extends also to machines for the fabrication of these products.

Description of the Prior Art

Machines of this type, also known as gluer-folders, comprise a working top on which is made to travel the piece to be folded peripherally and a main shaft driven through a transmission by an electric motor.

The main shaft drives various members for the transport with reciprocating movement of the work to be processed in accordance with straight or curved directions and for movement lengths (so-called movement pitch) varying in accordance with the length to be executed. The pitch movements take place thanks to a second motor, generally of the step or some other type.

Folding means are also provided for folding the work piece peripherally, pressing means for holding and advancing the folded piece, a glue feeder, and a plurality of photoelectric cells located in various points of the work top to identify the presence and serial conformations of the work piece being processed. The signals detected by the photoelectric cells allow automatic control through processing circuits of the beginning and end of application of the glue, reduction or increase of the pitch in accordance with the type of length (of folding) to be executed, main motor speed change, insertion of a cutting blade, etc.

Means for folding of the length to be folded generally consist of a folding shoe cooperating with a guide or fixed striker and an oscillating finger for folding the edge of the piece against the folding shoe.

Usually the folding shoe is axially hollow and through it is fed the glue in a predetermined quantity depending on the machine rotation speed and pitch. The glue is kept at a predetermined temperature in a tank and delivered through a gear pump controlled through servomechanisms by an electric motor, e.g. a step motor.

There are also provided knives or blades for performance of cuts in the work piece to facilitate folding generally opposite the internal curvatures.

These machines were originally provided for use substantially under manual control and were recently equipped with automatic control means of the electronic type based on programmed microprocessors in which the working parameters can be modified in accordance with the work piece being processed, thus providing automatic operation but still under the supervision of the operator.

Typical operating parameters in this sense are speed of feed, transport pitch, glue delivery, etc.

It has also been proposed to equip the control unit with a sufficiently capacious memory to contain the functional parameters of a large number of work pieces which the machine is capable of producing. These parameters are memorized in advance and in fact constitute an essential part of the machine. The parameters of a given piece are called up upon selection by the operator of this piece which, for example, is characterized by the type of shoe, the number, right or left, type of leather, etc. A machine of this kind is described for example in EP-A-0 340 695.

Folding-glueing machines of the above type have however some limitations and shortcomings.

In the first place, for these known machines it is necessary to define in advance all the parameters of the several uppers or in general of the pieces to be processed and memorize them. Therefor this machine has considerable complexity of the setting up operations and in addition is preset for a certain number of uppers or pieces which may never be used during the life of the machine.

In addition, programming of the parameters can be excessively rigid, e.g. a lot of skins softer than foreseen can require reprogramming at least of some parameters of a setting, which is performed on the basis of defects found in the first pieces processed.

Finally, known machines allow memorization only of three values for each of the main parameters of speed and pitch, i.e. one for the straight lengths, one for the curved lengths with inward concavity (internal curves), and one for the curved sections with outward concavity (external curves).

SUMMARY OF THE INVENTION

The object of the present invention is to provide a machine for folding and peripheral glueing of the edges of sheet material not having the limitations and shortcomings of the known art as set forth above. More particularly, the object of the present invention is to provide a machine for folding and peripheral glueing of the edges of sheet material which would permit simple and easy input of the working parameters therefor each time for a single piece of work, thus eliminating the need for advanced programming of parameters for several work pieces to be processed.

Another object of the present invention is to provide a machine for folding and peripheral glueing of the edges of sheet material which would allow adaptation of the working parameters to the ability of the operator and consequently increasing productivity.

In accordance with the present invention a machine for folding and peripheral glueing of the edges of sheet material having the above mentioned characteristics comprises a working top on which moves a work piece to be processed, means of transport and movement of the piece comprising at least one main shaft driven through a transmission by at least one electric motor, a folding shoe cooperating with a guide or fixed striker, means for feeding predetermined quantities of glue from a tank kept at a given temperature, a plurality of actuators controlling the various parts of the machine and a control unit for the machine operating parameters in which the control unit comprises a programming device connected to said actuators and a memory accessible through said programming device and designed to contain the parameters used in a more recent processing of a piece executed manually by the operator.

In accordance with another aspect, the present invention also consists of pieces of work on a methods for definition of the operating parameters of a machine for folding and glueing peripherally the edges of sheet material of the type set forth above and comprising the following phases:
a) processing of a work piece by manual control;
b) memorizing in sequence for each straight, right curved or left curved length of the path, of the point by point value of the transport speed, the travel pitch used by the operator and any insertion of the cutting blade;
c) memorizing in sequence for each straight, right curved or left curved part of the path of the values of the remaining parameters selected by the operator;
d) holding in the memory of the parameters thus obtained until a subsequent processing as set forth in phase a) above.

In accordance with the invention therefore memorization of the settings of the operating parameters is performed in the field while working. Programming of the machine is thus very much simplified and readily adaptable to the procedures and ability of each operator, who personally and directly programs the control unit.

In addition, in accordance with the present invention it is possible to optimize speed during travel.

BRIEF DESCRIPTION OF THE DRAWINGS

For better understanding, the invention is described below with reference to the figures of the annexed drawings which represent a preferred but non limiting embodiment by way of example of the present invention and wherein:

FIG. 1 shows a diagrammatic view of a machine for folding and glueing of uppers in accordance with the present invention, FIG. 1A shows an enlarged view of a part of FIG. 1, FIG. 2 shows a diagrammatic view of some control members of the machine of FIG. 1, FIG. 3 shows a plan view of the working top of the machine of FIG. 1 with a possible arrangement of the photoelectric cells, FIG. 4 shows a block diagram of the control unit of the machine in accordance with the present invention.

DESCRIPTION OF THE PREFERRED EMBODIMENTS

Figure 5:
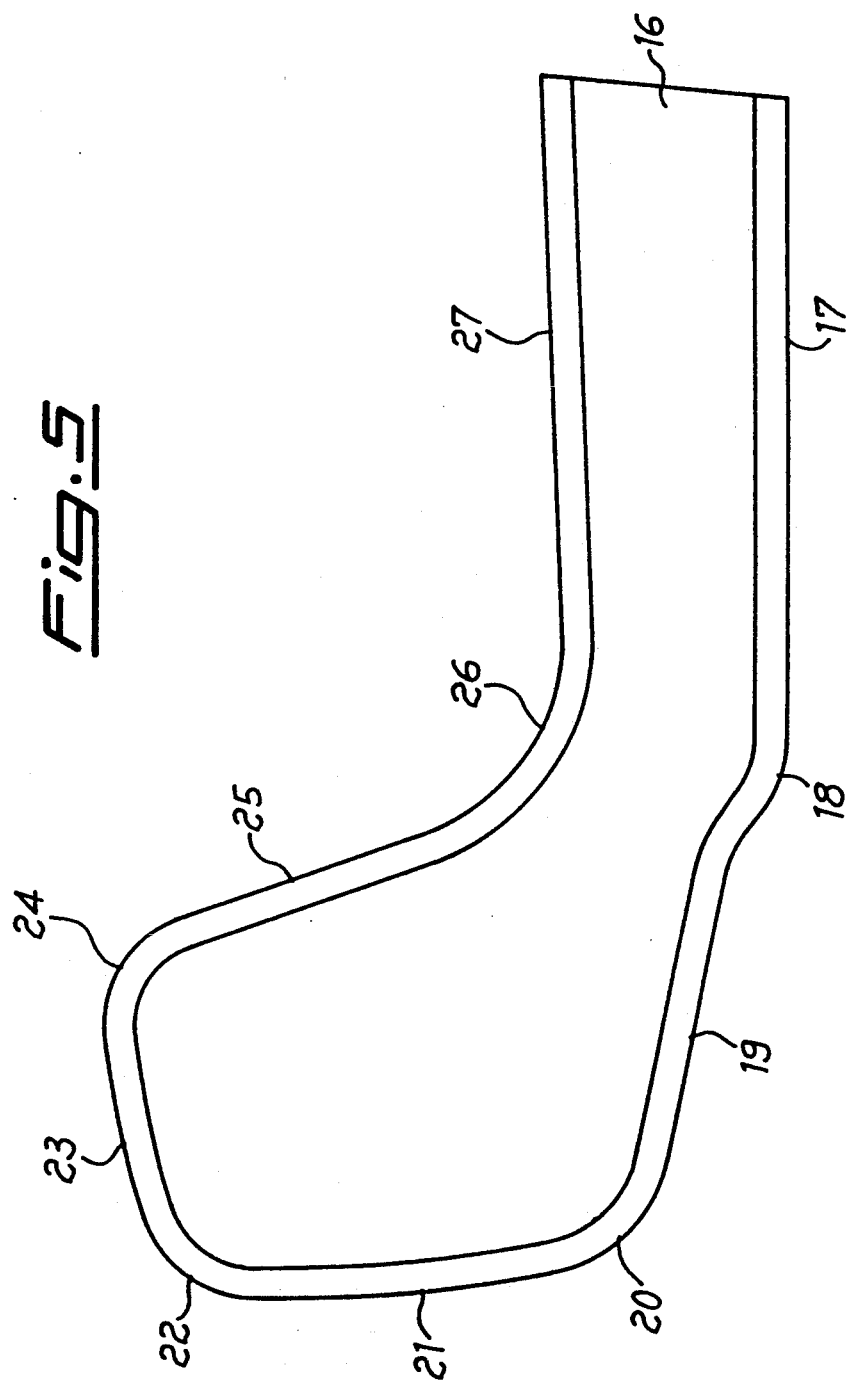
FIG. 5 shows diagrammatically an upper element for explanation of the learning cycle.

With reference to the figures the machine for folding and peripheral glueing of the edges of sheet material of the present invention comprises a folding shoe 1 cooperating with a guide 2 for glueing and folding of a work piece 3 shown in the enlarged detail on the side. The work piece 3 moves on the work top 4 thanks to a main transport shaft 5 driven by a first motor (not shown) while a second motor 6 of the step type regulates the transport pitch through various mechanisms.

A gear pump 7 driven by a third motor 8 feeds with melted glue the folding shoe 1 through a duct indicated generally by reference number 9. A cutting blade is shown at 28.

On the work top 4 is provided a plurality of photoelectric cells or photo-sensitive elements for control of the dimensions of the work piece and automatic regulation of some parameters.

A possible and preferred arrangement of the photoelectric cells is illustrated in greater detail in FIG. 3 which shows a plan view of the working top 4 on which the photoelectric cells are divided in groups each made up of two or more photoelectric cells. More specifically, a first group 10 serves for starting and stopping the glue, starting and stopping the main motor, and detection of the straight shape and variations of the connected regulations. The photoelectric cells of a second group 11 serve for detection of the external shapes and variations connected thereto while the photoelectric cells of a third group 12 serve for detection of the internal shapes and variations connected thereto as well as for possible insertion of the blade.

A machine of the type described above is well known and available on the market so that it has not been further described.

In accordance with the present invention the machine operates thanks to a control unit (UC) whose structure is illustrated with reference to FIG. 4.

The control unit (UC) comprises a processor $\mu P$ connected to a memory M, typically a random access memory (RAM), a keyboard T and a display DS. The $\mu P$ controls serial actuators A1-An which control the various parts of the machine, e.g. A1 controls the main motor Mp, A2 the step motor Mpp for transport and so forth.

In accordance with the present invention the memory M has a capacity sufficient to contain all the functional parameters for an upper and these parameters are memorized therein through a programming unit or device PR which receives the values (learning values) from the actuators A1-An while the operator executes the folding of the work piece being processed while controlling the machine manually. The memory M can be considered as divided in a certain number of elements from M1 to Mr, each corresponding to one of the parameters to be memorized and distinguished by an access address.

In particular, during the learning phase the parameter consisting of the speed of transport of the piece is detected by the speed of the main shaft 5 and is memorized in a cell of the memory M (e.g. M1) to be used in processing of the subsequent pieces.

Preferably the values of the parameters are memorized in differential form, i.e. the cell contains the increment (positive, negative or null) compared with the preceding value of the parameter in question.

With reference also to FIG. 2, during the learning phase, to change the speed of the main shaft the operator operates the pedal 13 while the transport pitch is changed with the pedal 14 and the cutting blade is inserted by the knee control 15.

Memorization of the various parameters takes place by a point by point procedure during processing, e.g. at each revolution of the main shaft or opposite corners or movements considered suitable.

There is illustrated below with reference to FIG. 5 a learning cycle in accordance with the present invention.

The work piece indicated generally by reference number 16 is placed on the work top 4 under the folding shoe 1 and the guide 2, the first length to be executed being for example the straight length 17. By means of the pedals 13 and 14 the operator adjusts transport speed and pitch for the work piece and the values memorized during this first phase are entered in one (or more) of the memory cells Ml-Mr. When the proximity of the curved length 18 is reached some of the photoelectric cells 11 are freed or uncovered, the number and position of the uncovered photoelectric cells being representative of a more or less sharp curve.

In the meantime the operator has changed the speed and pitch considered among the most suitable for a good result and in accordance with his own ability. These changes are memorized in another memory cell in sequence with the first length executed. The field between a memory cell and the subsequent one is given by the change of use of the photoelectric cells.

In the same manner the various paths in continuous 19, 20, 21, ... 26, 27 are performed. At the end of the path the entire path is memorized with the other parameters entered.

In accordance with an embodiment of the invention some or all of the values memorized during the path can be average values, e.g. taking the average of the values detected and entering in the cell the average value thus obtained.

If we consider the straight or curved sections there is differentiated memorization between each section.

From the foregoing it is clear that the invention achieves various advantages.

More precisely, complete memorization of the path is obtained with several path speeds and pitches while in accordance with the known art there were only three parameters, i.e. one for all the straight sections, one for the internal curves and one for the external curves.

The invention also allows optimization of the path to improve the final result of the work piece and higher productivity by having available the best pairing in the various sections travelled in accordance with the requirements of the work piece and the operator's ability.

Another advantageous characteristic of the invention is that the values memorized during the travel can be averaged, e.g. averaging the memorized values and keeping in the cell the average value thus found. Constant speed and pitch are thus obtained, further improving the finished product.

After learning, it is possible to change the individual values obtained with no need to repeat complete memorization. In other words the PR unit allows access to any position of the memory M, display of the present value and modification of the content from the keyboard.

Another advantageous characteristic of the machine in accordance with the invention is that it allows exclusion of the cutting function during internal curves.

This procedure can be memorized during learning so as to not require the operator to intervene manually (usually with a knee control) to exclude this operation at the desired curve.

Although the invention has been described in conjunction with specific embodiments it is evident that many alternatives and variations will be apparent to those skilled in the art in light of the foregoing description. Accordingly, the invention is intended to embrace all of the alternatives and variations that fall within the spirit and scope of the appended claims.

We claim:

1. A machine for folding and peripheral gluing the edges of a sheet material, said sheet material being a piece of work to be folded peripherally and glued onto a folding shoe, said machine comprising a working top (4), transporting means for transporting a piece of work (3) onto said working top and for moving said piece of work (3) thereon, said transporting means comprising at least one main shaft (5) driven through a transmission by a first motor and a second motor (6) for regulating the transport pitch, a folding shoe (1) on which said piece of work is to be peripherally folded and glued, a tank for holding glue at a predetermined temperature, means (9) for feeding predetermined quantities of said glue from said tank onto said folding shoe, a third motor (8) for controlling the feeding of said glue, means (2) for guiding said folding shoe to a position whereby said folding shoe and said piece of work cooperate to fold the edges of said piece of work and to glue said edges on said folding shoe, means for inserting a cutting blade for performing a cutting operation, a plurality of actuators (Al-An) located on said work top for controlling said first motor, said second motor and said third motor, said transporting means for transporting said piece of work, said second motor, said means for feeding said glue, said means for inserting said cutting blade at predetermined operating parameters, a control unit UC) for said operating parameters wherein said control unit (UC) comprises a programming device (PR) connected to said actuators (Al-An) and a memory (M) accessible through said programming device (PR) and designed to contain said operating parameters used in a most recent processing of a work piece (3) executed manually by the operator.

2. The machine in accordance with claim 1 wherein said control unit (UC) also comprises a keyboard (T), a display device (DS) and a microprocessor uP connected to said programming device (PR), to said memory (M), to said keyboard (T) and to said display device (DS).

3. The machine in accordance with claim 1 wherein said memory (M) is divided in a predetermined number of elements (Ml-Mr) each of which corresponds to one of said parameters to be memorized.

4. The machine in accordance with claim 1 wherein said programming device (PR) memorizes the step value of at least one of said operating parameters.

5. The machine according to claim 4 characterized in that at least one of said memorized values is a mean value.

6. The machine according to claim 4 wherein said memorized values comprise said transport speed and said pitch.

7. The machine in accordance with claim 6 wherein said shoe has internal curvatures and said memorized values comprise a datum of insertion of said cutting blade along said internal curvatures.

8. The machine in accordance with claim 1 whereon said folding shoe is shoe uppers.

9. In a method of folding and peripherally gluing the edges of a piece of work onto a shoe, in a machine wherein a piece of work is transported onto the working top of said machine and moved thereon along a path which comprises straight portions, portions with inward concavity and portions with outward concavity, said machine comprising means for feeding a glue to said shoe and controlling the amount thereof, means for inserting a cutting blade, means for controlling the speed of said piece of work, means for controlling the transport pitch of said piece of work, the machine having operating parameters for a) the transport speed of said piece of work b) the transport pitch of said piece of work c) the amount of the glue d) the insertion of the cutting blade and e) the portions of inward and outward concavity, the method of defining said operating diameters which comprise the following steps:

a) processing said work piece by manual control;
 b) memorizing in sequence for each straight portion, each portion with inward concavity and each portion with outward concavity, the point by point value of transport speed, travel pitch used by the operator and any cutting blade insertion;
 c) memorizing in sequence for each of said straight portion and each of said portions of inward concavity and each of said portions of outward concavity the remaining values parameters selected by the operator;
 d) memorizing the parameters obtained in steps b) and c) until a subsequent processing as set forth in step a) above.

10. The method according to claim 9 wherein the machine has a plurality of actuators (A1-An) located on said work top and said values of said parameters are memorized in a memory (M) by means of a programming device (PR) which receives said values from said actuators (A1-An) while the operator folds the work piece and controls the machine manually.

11. The method according to claim 9 wherein the machine has a first pedal (13), a second pedal (14) and a knee control and the step of controlling the speed of said piece of work is carried out by pressing said first pedal, and the step of controlling the transport pitch of said piece of work is carried out by pressing said second pedal and the step of controlling the insertion of the blade is controlled by the operator by pressing said knee control.

* * * * *